(12) United States Patent
Bhattacharya et al.

(10) Patent No.: US 9,247,516 B2
(45) Date of Patent: Jan. 26, 2016

(54) ESTIMATING WHETHER OR NOT A WIRELESS TERMINAL IS IN A GEOGRAPHIC ZONE USING PATTERN CLASSIFICATION

(75) Inventors: Tarun Kumar Bhattacharya, San Jose, CA (US); Martin Feuerstein, Redmond, WA (US); Scot Douglas Gordon, Bothell, WA (US)

(73) Assignee: Polaris Wireless, Inc., Mountain View, CA (US)

( * ) Notice: Subject to any disclaimer, the term of this patent is extended or adjusted under 35 U.S.C. 154(b) by 1608 days.

(21) Appl. No.: 11/844,175

(22) Filed: Aug. 23, 2007

(65) Prior Publication Data

US 2008/0207222 A1    Aug. 28, 2008

Related U.S. Application Data

(63) Continuation-in-part of application No. 11/680,496, filed on Feb. 28, 2007.

(51) Int. Cl.
*H04W 24/00* (2009.01)
*H04W 64/00* (2009.01)
*G01S 5/02* (2010.01)
*H04W 4/02* (2009.01)

(52) U.S. Cl.
CPC ............ *H04W 64/00* (2013.01); *G01S 5/0252* (2013.01); *H04W 4/02* (2013.01)

(58) Field of Classification Search
USPC ............ 455/404.1, 404.2, 456.1–456.6, 418, 455/421
See application file for complete search history.

(56) References Cited

U.S. PATENT DOCUMENTS

| | | | |
|---|---|---|---|
| 6,148,194 A * | 11/2000 | Kao et al. | 455/421 |
| 6,362,783 B1 * | 3/2002 | Sugiura et al. | 342/457 |
| 6,522,888 B1 * | 2/2003 | Garceran et al. | 455/456.3 |
| 6,556,819 B2 * | 4/2003 | Irvin | 455/410 |
| 6,671,506 B1 * | 12/2003 | Lee | 455/406 |
| 6,980,804 B2 | 12/2005 | Maki et al. | |
| 7,043,254 B2 * | 5/2006 | Chawla et al. | 455/456.1 |
| 7,218,938 B1 | 5/2007 | Lau et al. | |
| 7,532,906 B2 * | 5/2009 | Enenkiel | 455/550.1 |
| 7,903,029 B2 * | 3/2011 | Dupray | 342/457 |
| 2001/0022558 A1 | 9/2001 | Karr et al. | |
| 2002/0042269 A1 | 4/2002 | Cotanis | |
| 2003/0129992 A1 | 7/2003 | Koorapaty et al. | |
| 2003/0153331 A1 * | 8/2003 | Alger | 455/456 |
| 2004/0243298 A1 | 12/2004 | Knuuttila et al. | |
| 2005/0048987 A1 * | 3/2005 | Glass | 455/456.1 |
| 2005/0272443 A1 * | 12/2005 | Hose et al. | 455/456.1 |
| 2006/0172731 A1 * | 8/2006 | Tobe et al. | 455/421 |
| 2006/0281472 A1 | 12/2006 | Walter | |
| 2007/0004454 A1 * | 1/2007 | Schweiger et al. | 455/558 |
| 2008/0076382 A1 * | 3/2008 | Girard et al. | 455/404.1 |

(Continued)

OTHER PUBLICATIONS

Nalini Vasudevan, Node Localization in Wireless Ad-Hoc Sensor Networks, (Jun. 2005), p. 9, 59.*

(Continued)

*Primary Examiner* — Mazda Sabouri
*Assistant Examiner* — Edward Zhang
(74) *Attorney, Agent, or Firm* — Kaplan Breyer Schwarz & Ottesen, LLP

(57) ABSTRACT

A method and apparatus are disclosed for estimating whether or not a wireless terminal is in a geographic zone. The illustrative embodiment employs a pattern classifier that is trained on traits of electromagnetic signals at various locations. A computer-executable program is then generated based on the trained pattern classifier, and the program is installed and executed on a subscribed identity module of the terminal.

23 Claims, 13 Drawing Sheets

(56) References Cited

U.S. PATENT DOCUMENTS

| | | | |
|---|---|---|---|
| 2008/0084858 A1* | 4/2008 | Hart et al. | 370/342 |
| 2008/0085692 A1* | 4/2008 | Hart | H04W 16/20 455/187.1 |
| 2008/0166973 A1* | 7/2008 | Hart | H04W 16/18 455/67.11 |

OTHER PUBLICATIONS

Zhang, Xiang, "U.S. Appl. No. 11/680,496 Office Action Oct. 8, 2009", , Publisher: USPTO, Published in: US.

Zhang, Xiang, "U.S. Appl. No. 11/680,496 Office Action Apr. 7, 2010", , Publisher: USPTO, Published in: US.

Zhang, Xiang, "U.S. Appl. No. 11/680,496 Office Action Oct. 27, 2010", , Publisher: USPTO, Published in: US.

Zhang, Xiang, "U.S. Appl. No. 11/680,496 Office Action Apr. 29, 2011", , Publisher: USPTO, Published in: US.

Zhang, Xiang, "U.S. Appl. No. 11/680,496 Office Action Sep. 27, 2011", , Publisher: USPTO, Published in: US.

Zhang, Xiang, "U.S. Appl. No. 11/680,496 Notice of Allowability", Aug. 23, 2012, Publisher: USPTO, Published in: US.

* cited by examiner

ESTIMATING WHETHER OR NOT A WIRELESS TERMINAL IS IN A GEOGRAPHIC ZONE USING PATTERN CLASSIFICATION

FIELD OF THE INVENTION

The present invention relates to wireless telecommunications in general, and, more particularly, to methods and systems for estimating whether a wireless terminal is inside a geographic zone.

BACKGROUND OF THE INVENTION

FIG. 1 depicts a diagram of the salient components of wireless telecommunications system 100 in accordance with the prior art. Wireless telecommunications system 100 comprises: wireless terminal 101, base stations 102-1, 102-2, and 102-3, and wireless switching center 111, interconnected as shown. Wireless telecommunications system 100 provides wireless telecommunications service to all of geographic region 120, in well-known fashion.

In some cases, the owner/operator of wireless telecommunications system 100 might desire to charge its customers different rates depending on where they are at the time that they are using its service. For example, to better compete with land-based wireline telephone service, the owner/operator might desire to charge its customer a lower rate when they are at home and a higher rate when they are out shopping. In this case, the owner/operator might define the customer's home as a geographic "zone" and charge less for calls made from that zone. The efficacy of this idea requires, however, a technique for estimating when a wireless terminal is in a zone and when it is not.

Naturally, if there is a mechanism for ascertaining the location of the terminal (e.g., Global Positioning System [GPS], etc.), then it is a simple matter to determine whether the terminal is inside or outside of a particular zone. However, only a small percentage of wireless terminals presently have built-in GPS receivers, and therefore a GPS-based system is not a viable option. Furthermore, it is well known that GPS receivers do not work well, if at all, indoors and in large cities.

Alternatively, one might use a location system that works with "ordinary" wireless terminals (for example, the system taught in U.S. patent application Ser. No. 11/419,649, entitled "Estimating the Location of a Wireless Terminal Based on Non-Uniform Locations", filed 22 May 2006, which is incorporated by reference). Such location systems typically involve extensive processing and storage, and are, therefore, deployed within the network infrastructure, rather than on the terminal itself. This approach, however, has two disadvantages. First, it is essentially an "overkill" solution, as it requires substantial (and potentially expensive) processing and storage hardware to solve a different problem than is necessary—estimating the exact location of a terminal—when the problem at hand is estimating whether the terminal is inside a geographic zone. Second, this approach introduces substantial communication overhead between the wireless terminal and the network infrastructure, which is naturally undesirable.

What is needed, therefore, is a technique for estimating whether or not a wireless terminal is inside a zone without some of the costs and disadvantages for doing so in the prior art.

SUMMARY OF THE INVENTION

The present invention provides a technique for estimating whether or not a wireless terminal is in a geographic zone Z without some of the costs and disadvantages for doing so in the prior art. In particular, the illustrative embodiment employs a pattern classifier (e.g., a neural network, a decision tree, a support vector machine [SVM], etc.) that is trained via a learning algorithm on a plurality of input/output mappings. The input of each mapping is based on one or more traits of one or more electromagnetic signals at a particular location L (e.g., the signal strength of a particular signal at location L, the time difference of arrival between two signals at location L, etc.), and the output of each mapping is a Boolean value that indicates whether or not location L is inside of zone Z. Each signal trait for location L might be empirical in nature (i.e., measured at location L), or might be derived from a mathematical model, or from a database of signal trait values, or might be a combination of an empirical measurement and a theoretical model.

During training, the pattern classifier learns to distinguish between the locations of the training set that are inside of and outside of zone Z. When the training procedure is effective, the pattern classifier also learns to predict, with relatively high accuracy, whether other locations not in the training set are inside or outside of zone Z. This prediction capability, known as generalization, is a result of the pattern classifier inferring rules and identifying patterns during training.

In accordance with the illustrative embodiment, after the pattern classifier has been trained, a computer-executable program is generated based on the trained pattern classifier. The computer-executable program is then transmitted to a wireless terminal, where it is installed and executed on a subscribed identity module of the terminal.

The illustrative embodiment comprises: generating a computer-executable program that (i) accepts an input based on one or more traits of one or more electromagnetic signals at a geo-location, and (ii) outputs an indication of whether the geo-location is inside a geographic zone Z; and transmitting the computer-executable program to a wireless terminal for local execution at the wireless terminal.

DETAILED DESCRIPTION

Figure 1:
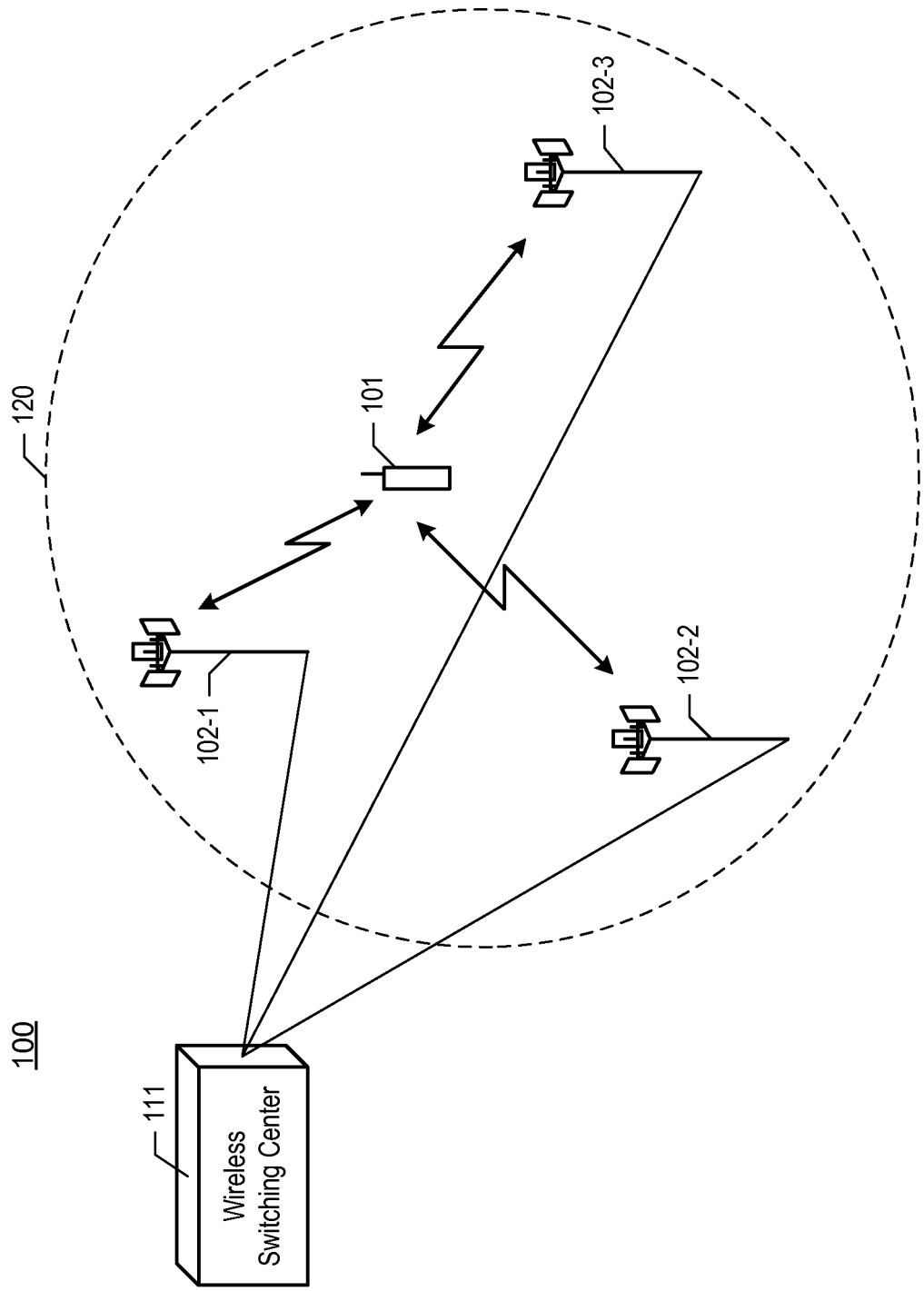
FIG. 1 depicts a diagram of the salient components of wireless telecommunications system 100 in accordance with the prior art.
Figure 2:
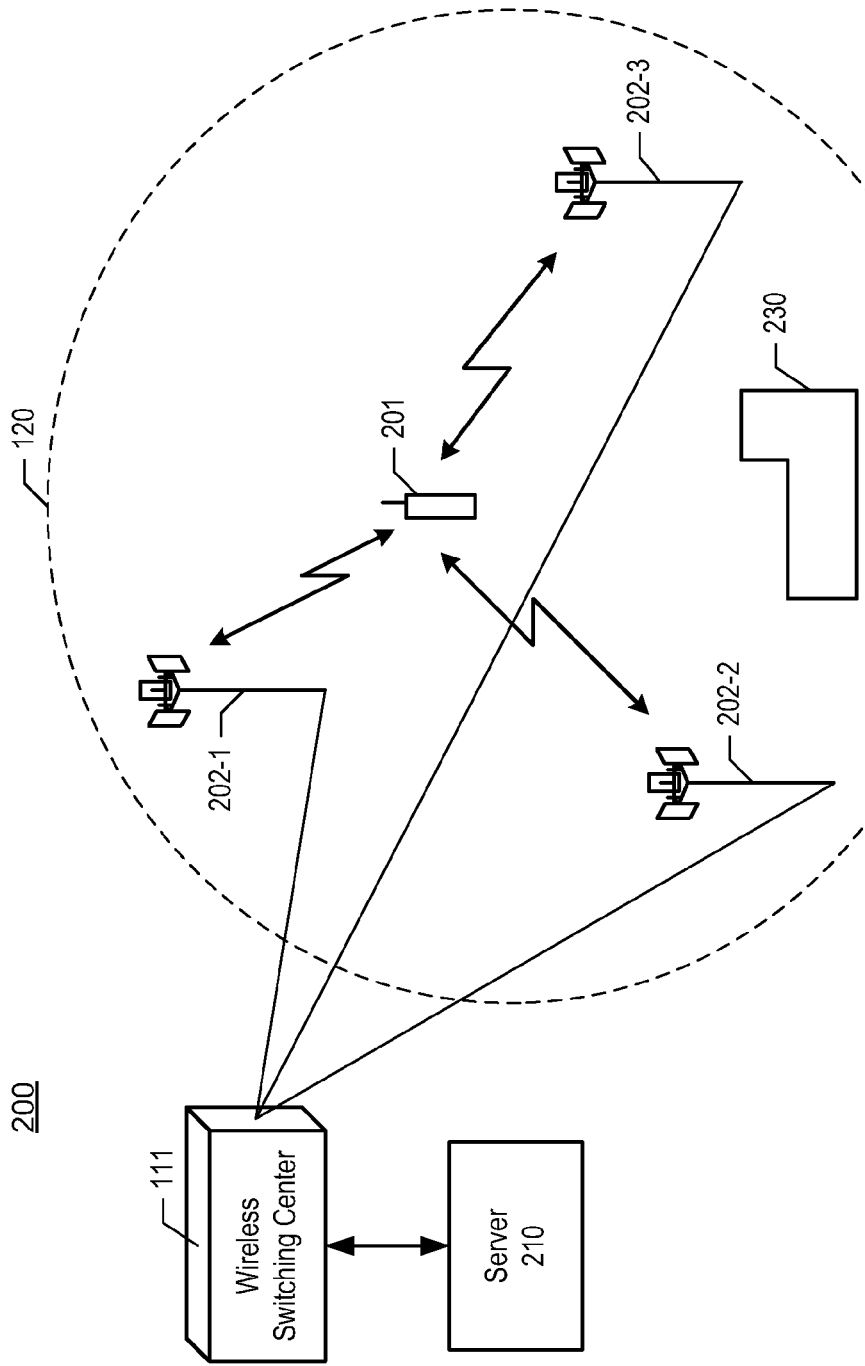
FIG. 2 depicts a schematic diagram of the salient components of wireless telecommunications system 200 in accordance with the illustrative embodiment of the present invention.

FIG. 2 depicts a schematic diagram of the salient components of wireless telecommunications system 200 in accordance with the illustrative embodiment of the present invention. As shown in FIG. 2, wireless telecommunications system 200 comprises wireless terminal 201, base stations 202-1, 202-2, and 202-3, wireless switching center 211, and location server 210, interrelated as shown. The illustrative embodiment provides wireless telecommunications service to all of geographic region 120, in well-known fashion, estimates whether or not wireless terminal 201 is in geographic zone 230, and uses that estimate in a zone-based application.

In accordance with the illustrative embodiment, wireless telecommunications service is provided to wireless terminal 201 in accordance with the Universal Mobile Telecommunications System, which is commonly known as "UMTS." After reading this disclosure, however, it will be clear to those skilled in the art how to make and use alternative embodiments of the present invention that operate in accordance with one or more other air-interface standards (e.g., Global System Mobile "GSM," CDMA-2000, IS-136 TDMA, IS-95 CDMA, 3G Wideband CDMA, IEEE 802.11 WiFi, 802.16 WiMax, Bluetooth, etc.) in one or more frequency bands.

Wireless terminal 201 comprises the hardware and software necessary to be UMTS-compliant and to perform the tasks described below and in the accompanying figures. For example and without limitation, wireless terminal 201 is capable of:

i. measuring one or more traits of one of more electromagnetic signals, and ii. reporting those measurements to server 210, and iii. transmitting one or more signals and of reporting the transmission parameters of those signals to server 210, and iv. estimating whether or not it is in zone 230, as described below and in the accompanying figures.

Wireless terminal 201 is mobile and can be at any location within geographic region 120. Although wireless telecommunications system 200 comprises only one wireless terminal, it will be clear to those skilled in the art, after reading this disclosure, how to make and use alternative embodiments of the present invention that comprise any number of wireless terminals. The details of wireless terminal 201 are described below and in the accompanying figures.

Base stations 202-1, 202-2, and 202-3 communicate with wireless switching center 211 and with wireless terminal 201 via radio in well-known fashion. As is well known to those skilled in the art, base stations are also commonly referred to by a variety of alternative names such as access points, nodes, network interfaces, etc. Although the illustrative embodiment comprises three base stations, it will be clear to those skilled in the art, after reading this disclosure, how to make and use alternative embodiments of the present invention that comprise any number of base stations.

In accordance with the illustrative embodiment of the present invention, base stations 202-1, 202-2, and 202-3 are terrestrial, immobile, and within geographic region 120. It will be clear to those skilled in the art, after reading this disclosure, how to make and use alternative embodiments of the present invention in which some or all of the base stations are airborne, marine-based, or space-based, regardless of whether or not they are moving relative to the Earth's surface, and regardless of whether or not they are within geographic region 120.

Wireless switching center 211 comprises a switch that orchestrates the provisioning of telecommunications service to wireless terminal 201 and the flow of information to and from server 210, as described below and in the accompanying figures. As is well known to those skilled in the art, wireless switching centers are also commonly referred to by other names such as mobile switching centers, mobile telephone switching offices, routers, etc.

Although the illustrative embodiment comprises one wireless switching center, it will be clear to those skilled in the art, after reading this disclosure, how to make and use alternative embodiments of the present invention that comprise any number of wireless switching centers. For example, when a wireless terminal can interact with two or more wireless switching centers, the wireless switching centers can exchange and share information that is useful in estimating the location of the wireless terminal. For example, the wireless switching centers can use the IS-41 protocol messages HandoffMeasurementRequest and HandoffMeasurementRequest2 to elicit signal-strength measurements from one another. The use of two or more wireless switching centers is particularly common when the geographic area serviced by the wireless switching center is small (e.g., local area networks, etc.) or when multiple wireless switching centers serve a common area.

In accordance with the illustrative embodiment, all of the base stations servicing wireless terminal 201 are associated with wireless switching center 211. It will be clear to those skilled in the art, after reading this disclosure, how to make and use alternative embodiments of the present invention in which any number of base stations are associated with any number of wireless switching centers.

In accordance with the illustrative embodiment, wireless switching center 211 is outside of geographic region 120. It will be clear to those skilled in the art, after reading this disclosure, how to make and use alternative embodiments of the present invention in which some or all of wireless switching center 211 is instead within geographic region 120.

Location server 210 is a data-processing system that is capable of training a pattern classifier, of generating a computer-executable program that simulates the trained pattern classifier, and of communicating with wireless switching center 211, as described below and with respect to FIGS. 4 through 11.

Geographic zone 230 is an illustrative region (e.g., a house, on office building, a college campus, etc.) that comprises one or more "locations" within geographic region 120. As will be appreciated by those skilled in the art, geographic zone 230 might have any shape, and could be represented in any of a variety of ways known in the art (e.g., a polygon, a parametric bounding surface, an enumerated set of discrete points, etc.). Although illustrative geographic zone 230 is depicted as a contiguous two-dimensional region in FIG. 3, it will be appreciated by those skilled in the art that geographic zone 230 might comprise a plurality of non-contiguous locations, or might have a number of dimensions other than two (i.e., zero, one, or three dimensions), or might be both non-contiguous and one- or three-dimensional, and it will be clear to those skilled in the art, after reading this disclosure, how to make and use embodiments of the present invention for such zones.

Figure 3:
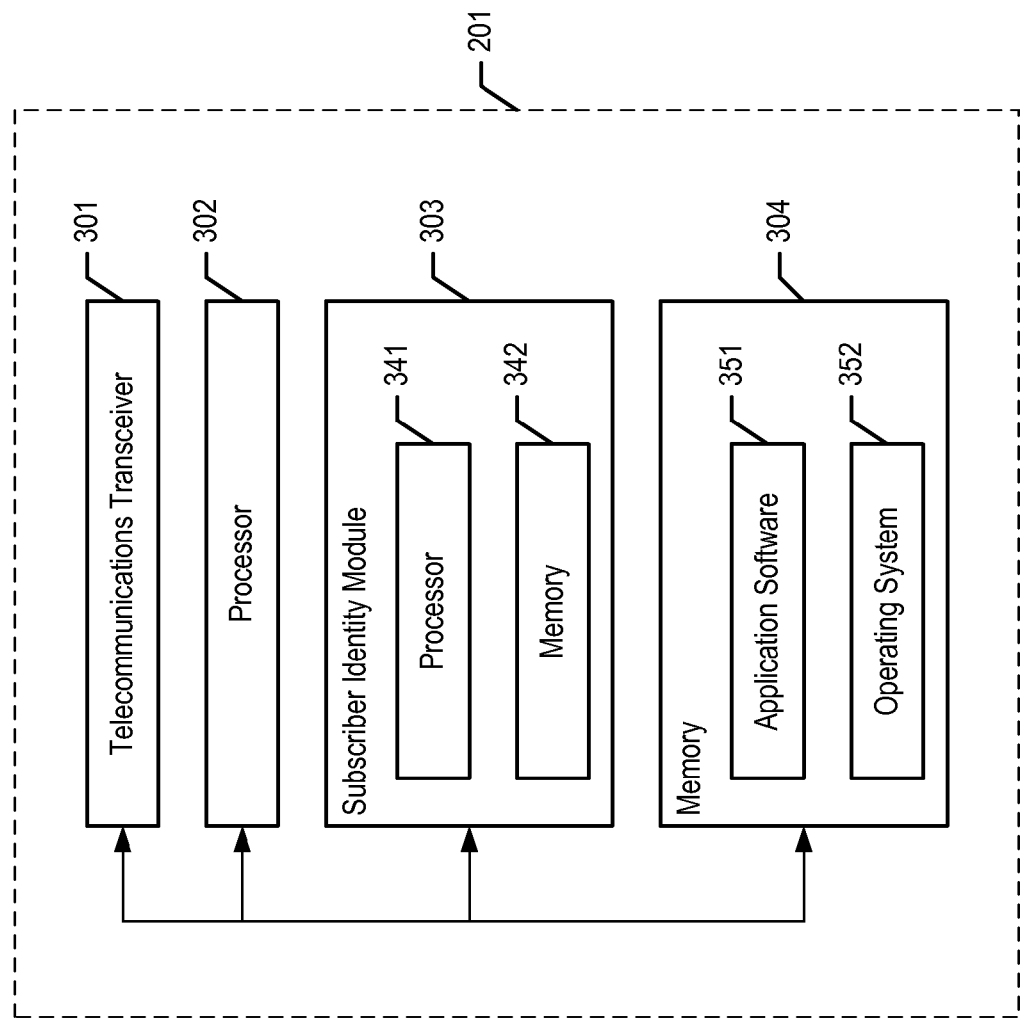
FIG. 3 depicts a block diagram of the salient components of wireless terminal 201 in accordance with the illustrative embodiment of the present invention.

FIG. 3 depicts a block diagram of the salient components of wireless terminal 201 in accordance with the illustrative embodiment. Wireless terminal 201 comprises: telecommunications transceiver 301, processor 302, subscriber identity module 303, and memory 304, interconnected as shown.

Telecommunications transceiver 301 is hardware and software that is capable of enabling wireless terminal 201 to communicate with base stations 202-1, 202-2, and 202-3 via radio. It will be clear to those skilled in the art, after reading this disclosure, how to make and use telecommunications transceiver 301.

Processor 302 is hardware that is a capable of executing application software 351 and operating system 352 in memory 304 in well-known fashion. It will be clear to those skilled in the art, after reading this disclosure, how to make and use processor 302.

Subscriber identity module (SIM) 303 is hardware and software that provides the unique identity to wireless terminal 201. Subscriber identity module 303 comprises processor 341 and memory 342. Processor 341 is hardware that is capable of executing application software in memory 342 in well-known fashion, and memory 342 is a non-volatile memory. It will be clear to those skilled in the art, after reading this disclosure, how to make and use subscriber identity module 303.

Memory 304 is a non-volatile memory that stores application software 351 and operating system 352 in well-known fashion. It will be clear to those skilled in the art, after reading this disclosure, how to make and use memory 304.

Figure 4:
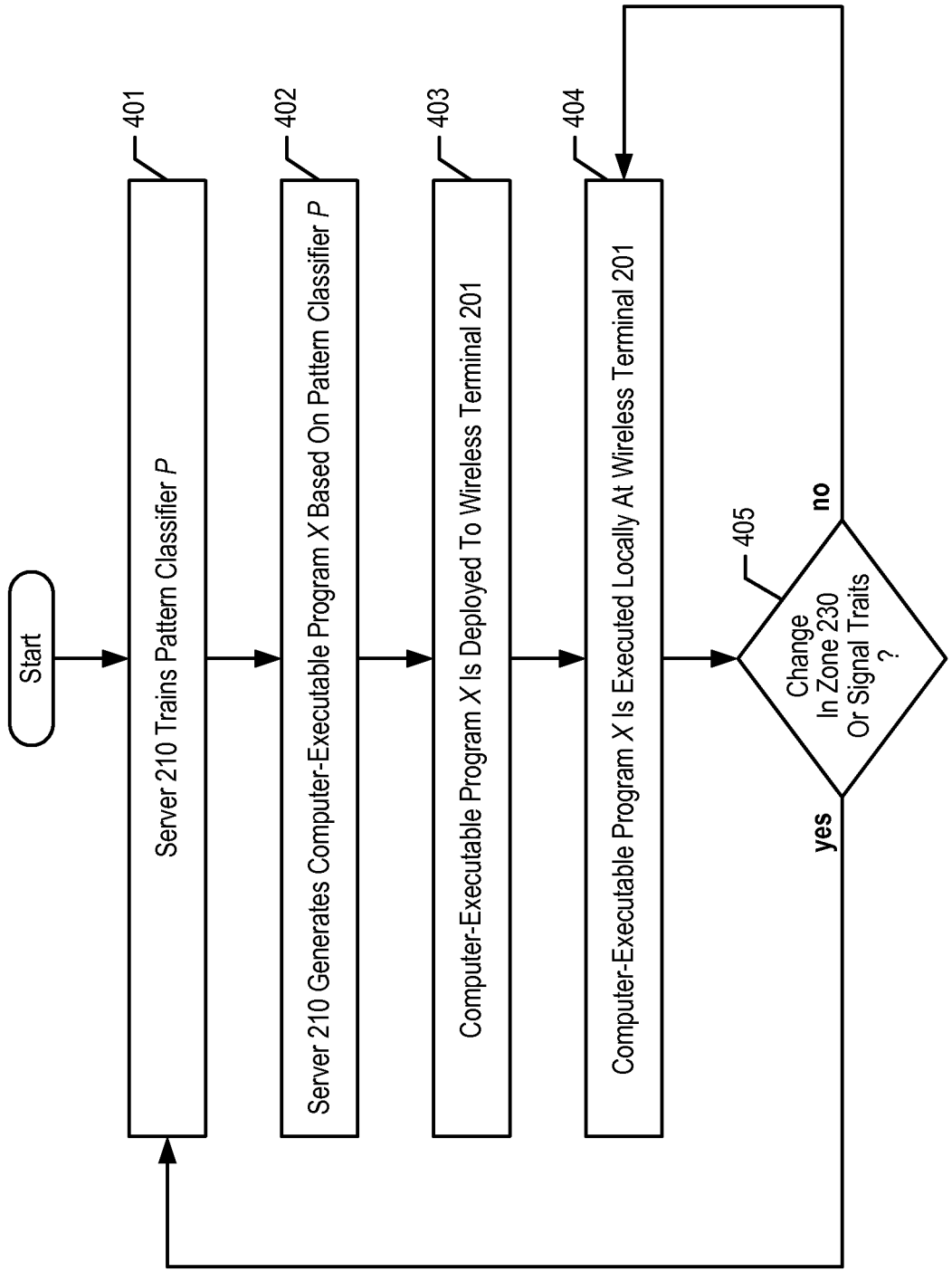
FIG. 4 depicts a flowchart of the salient tasks performed by location server 210, as shown in FIG. 2, in accordance with the illustrative embodiment of the present invention.

FIG. 4 depicts a flowchart of the salient tasks performed by location server 210 in accordance with the illustrative embodiment of the present invention. It will be clear to those skilled in the art, after reading this disclosure, which tasks depicted in FIG. 4 can be performed simultaneously or in a different order than that depicted.

At task 401, location server 210 trains a pattern classifier P in accordance with the procedure described below and with respect to FIGS. 5 through 7.

At task 402, location server 210 generates a computer-executable program X based on pattern classifier P, as described in detail below and with respect to FIG. 9.

At task 403, computer-executable program X is deployed to wireless terminal 201, as described in detail below and with respect to FIG. 10.

At task 404, computer-executable program X is executed locally at wireless terminal 201, as described in detail below and with respect to FIG. 11.

Task 405 checks whether there has been a change in geographic zone 230, or whether a change in any signal traits is expected at one or more locations in geographic region 120 (e.g., due to (i) the addition of a new base station 202 in wireless telecommunications system 200, or (ii) a change in channel assignments, or (iii) an upgrade of an existing base station 202, etc.). If so, execution continues back at task 401; otherwise execution continues back at task 404.

As is well-known to those skilled in the art, when execution continues back at task 401, it might be possible to do an "incremental" re-train at task 401 rather than a "complete" re-train from scratch. As is well-known in the art, this depends on factors such as the nature and magnitude of changes in the training set, the kind of pattern classifier P employed, and so forth, and it will be clear to those skilled in the art how to re-train pattern classifier P at task 401 accordingly.

Figure 5:
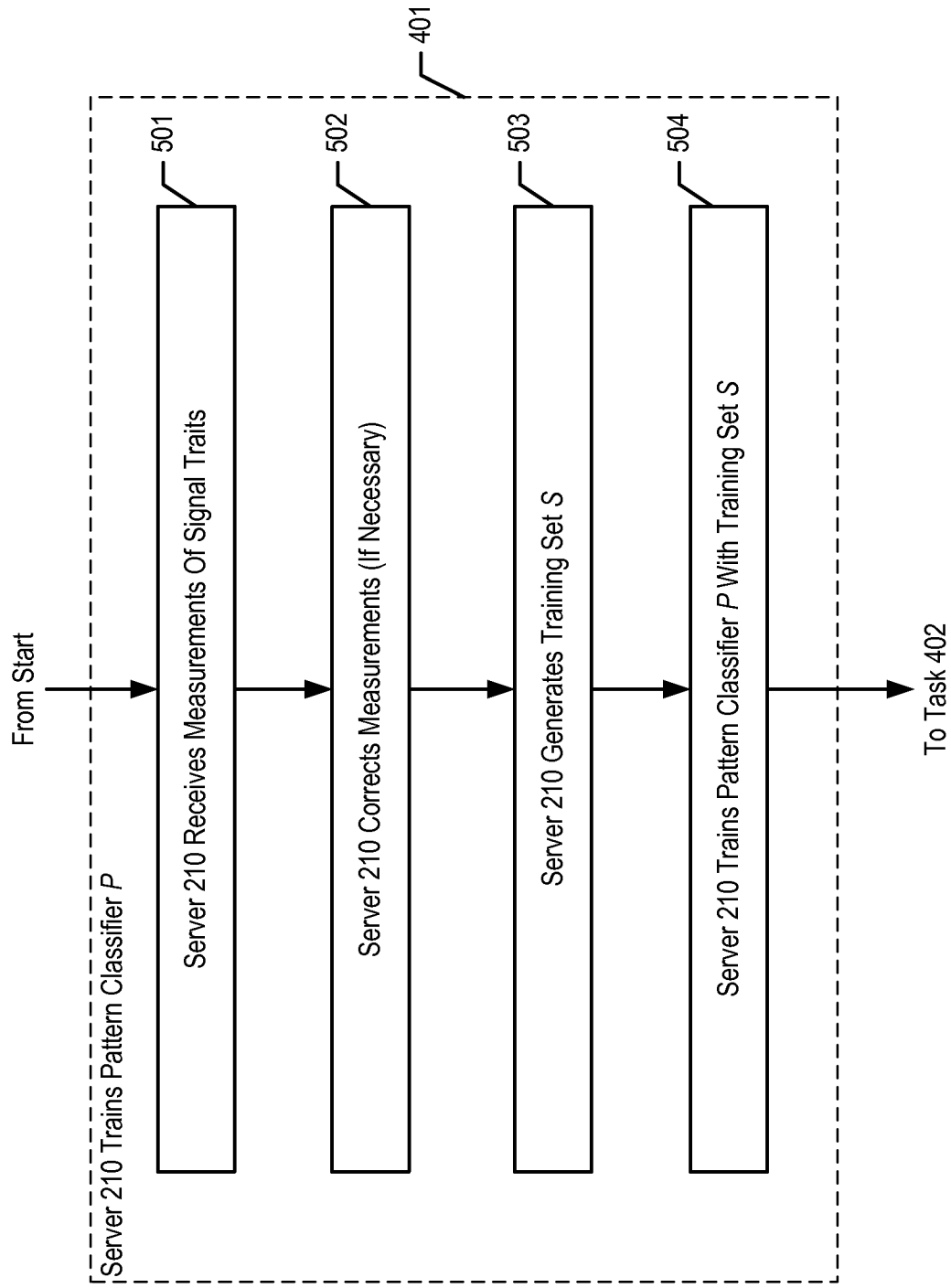
FIG. 5 depicts a detailed flowchart of task 401, as shown in FIG. 4, in accordance with the illustrative embodiment of the present invention.

FIG. 5 depicts a detailed flowchart of task 401 in accordance with the illustrative embodiment of the present invention. It will be clear to those skilled in the art, after reading this disclosure, which subtasks depicted in FIG. 5 can be performed simultaneously or in a different order than that depicted.

At subtask 501, location server 210 receives the signal traits for a plurality of locations. As will be appreciated by those skilled in the art, signal traits that are obtained by empirical measurement often have errors, some of which might be due to predictable factors, and some of which might be due to unpredictable factors. When the nature or magnitude of the measurement errors is unpredictable, there is little that can be done to compensate for them. However, measurement errors that are predictable can be corrected, and it is well-known in the art that the nature and magnitude of some measurement errors are in fact predictable. For example, the radio used to obtain the measurements might be known to incorrectly measure and report the strength of signals by a fixed amount (say, −2 dB). Consequently, it is advantageous, if possible, to correct such systemic errors prior to training pattern classifier P on the measurements. A technique for doing so based on distortion functions is now described below and with respect to FIGS. 6a through 6c.

The distortion function $D(A,K,Q)$ for a particular radio relates the reported measurement R for a trait Q (e.g., signal strength, to the actual value A for that trait and the defining characteristic K of the radio making the measurement:

$$R=D(A,K,Q). \quad\quad (Eq. 1)$$

In accordance with the illustrative embodiment, the distortion function $D(A,K,Q)$ for the radio that measures and reports the signal trait values is provided by the radio manufacturer. It will be clear to those skilled in the art, however, after reading this disclosure, how to generate the distortion function $D(A,K,Q)$ for any radio without the assistance of the radio manufacturer.

Figure 6A:
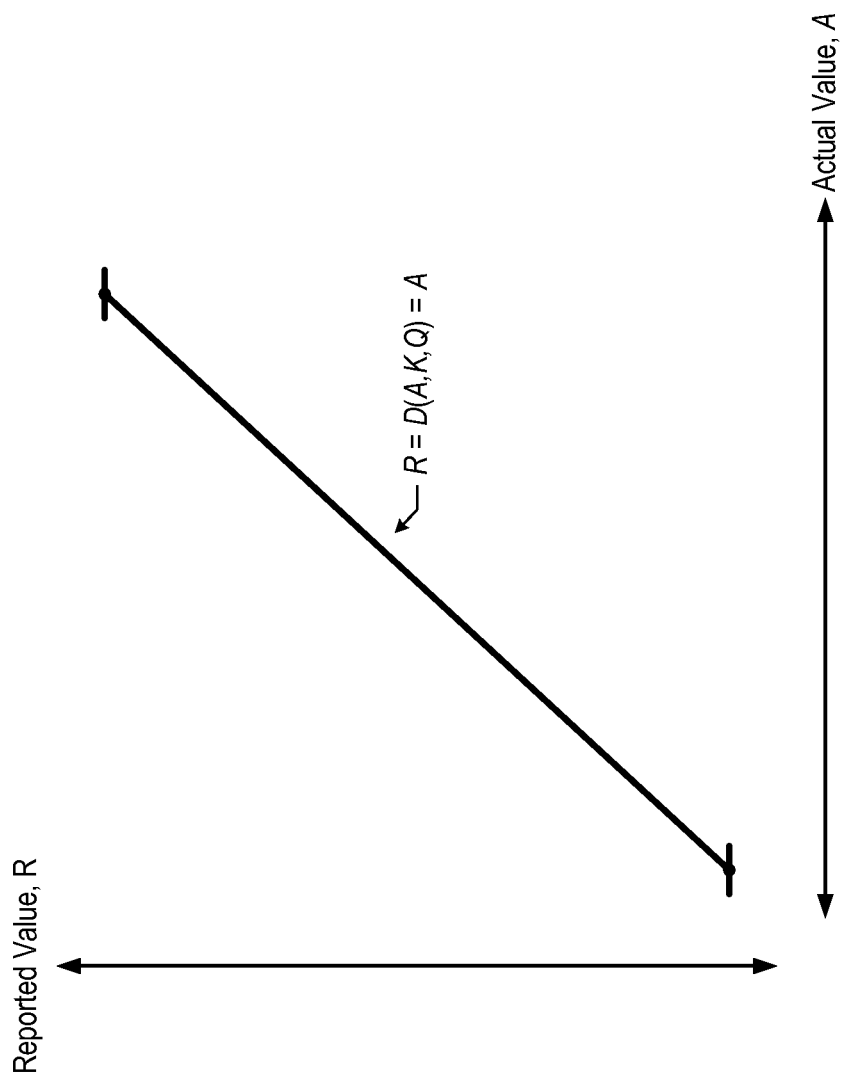
FIG. 6a depicts the distortion function D(A,K,Q) for one trait and for an ideal radio.

An ideal radio perfectly measures and reports the value of the traits it receives; the distortion function $D(A,K,Q)$ for one trait and for an ideal radio is depicted in FIG. 6a. As is apparent from the graph in FIG. 6a, the salient characteristic of an ideal radio is that the reported value of the measurement, R, is exactly equal to the actual value of the trait A at the radio's location (i.e., there is no measurement or reporting error).

Figure 6B:
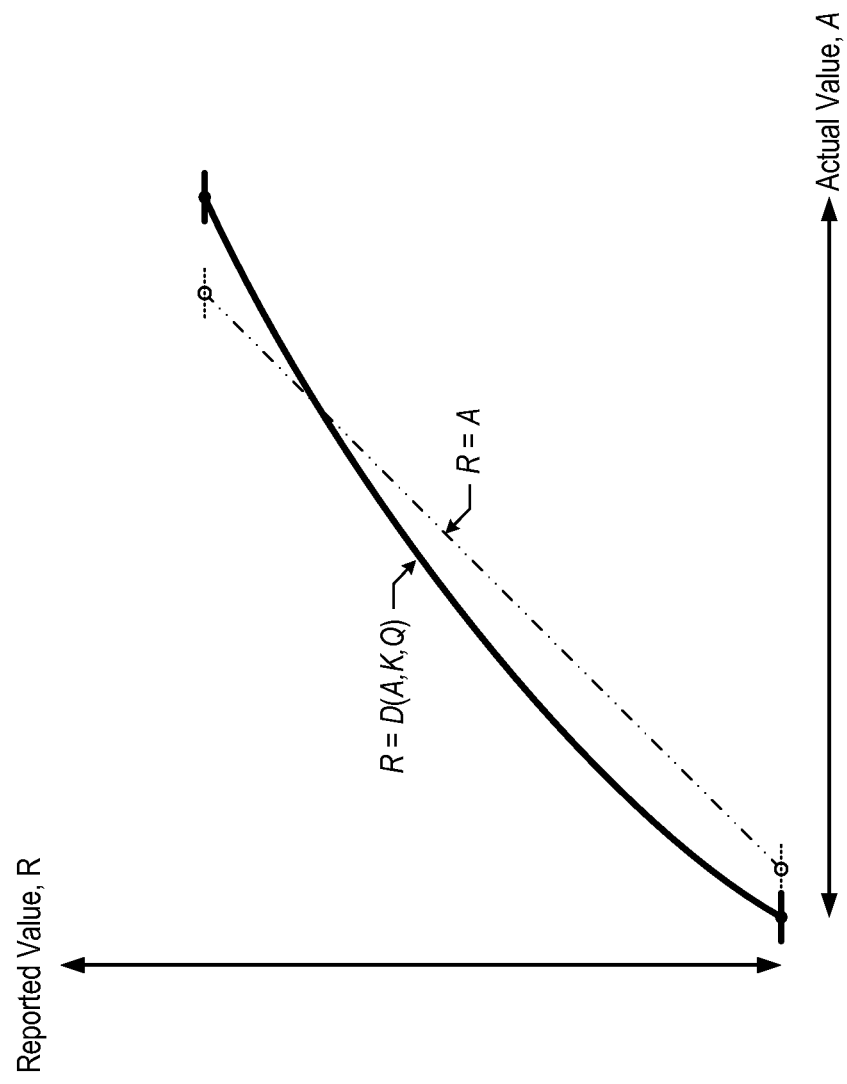
FIG. 6b depicts a graph of the distortion function of an illustrative real-world radio.

A real-world radio, in contrast, typically does not perfectly measure the traits of the signals they receive. This is particularly true for measurements of signal strength where the errors can be large. For example, FIG. 6b depicts a graph of the distortion function of an illustrative real-world radio. In this case, the reported measurement is too high for some values, too low for others, and correct for only one value.

The nature and magnitude of each of the errors in the reported measurements is inherent in the distortion function $D(A,K,Q)$, and, therefore, knowing the distortion function, a calibration function, denoted $C(R,K,Q)$, can be derived from the distortion function. Once obtained, the calibration function can be applied to the measurements to eliminate the distortion errors and thereby recover the actual values of the traits.

In general, the calibration function $C(R,K,Q)$ relates the calibrated measurement of a trait Q to the reported measurement R of trait Q and the defining characteristic K of the radio making the measurement:

$$R'=D(R,K,Q) \quad\quad (Eq. 2)$$

where R' denotes the calibrated value of measurement R.

The calibration function C(R,K,Q) is the inverse of the distortion function D(A,K,Q). In other words, the salient characteristic of the calibration function C(R,K,Q) is that it satisfies the equation:

$$R'=A=C(D(A,K,Q),K,Q) \quad \text{(Eq. 3)}$$

so that the calibrated measurement, R', is what the reported measurement, R, would have been had the radio making and reporting the measurement been ideal.

Figure 6C:
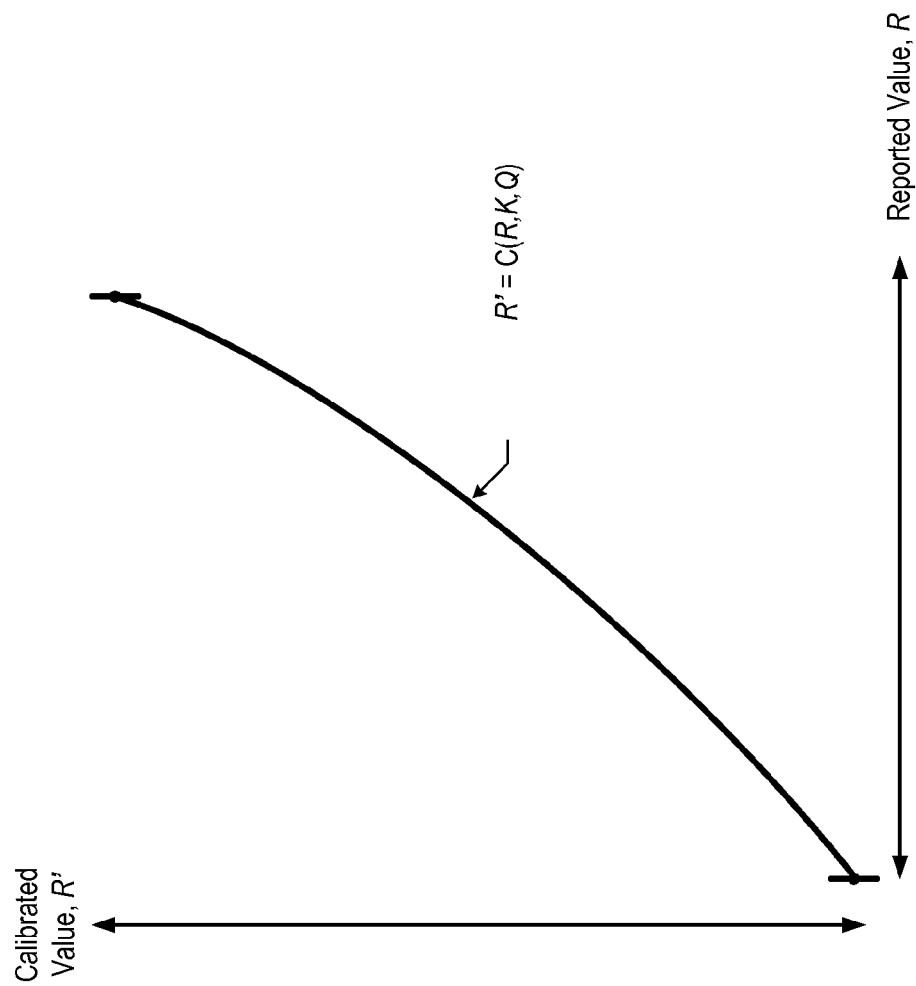
FIG. 6c depicts a graph of the calibration function C(R,K, Q) for the distortion function D(A,K,Q) depicted in FIG. 6b.

FIG. 6c depicts a graph of the calibration function C(R,K,Q) for the distortion function D(A,K,Q) depicted in FIG. 6b. It will be clear to those skilled in the art, after reading this disclosure, how to derive C(R,K,Q) from D(A,K,Q).

At subtask 502, location server 210 corrects the signal trait measurements received at subtask 501, if necessary, based on the radio that obtained the measurements, as described above.

At subtask 503, location server 210 generates a training set of input/output mappings, where the input of each mapping is a vector based on one or more of the corrected measurements, and the output of each mapping is a Boolean value that indicates whether the location associated with the input is inside geographic zone 230. As will be appreciated by those skilled in the art, each element of the input vector might correspond exactly to a "raw" (albeit corrected) measurement, or might be derived from a measurement (e.g., normalized, etc.), or might be derived from two or more measurements (e.g., the difference between two measurements, etc.), or might in fact be obtained from a mathematical model or database of signal trait values instead of measurements. Moreover, it is well-known in the art that determining which inputs to feed into a pattern classifier, as well as an appropriate data representation scheme, is an art in itself and critical for effective training.

As will be appreciated by those skilled in the art, in some embodiments of the present invention the output of one or more mappings might comprise a non-Boolean type—such as a real number in [0,1] corresponding to a quality or confidence metric (perhaps based on the Euclidean distance between the measurement vector and the training vector)—instead of the Boolean value described above, or in addition to this Boolean value.

Figure 7:
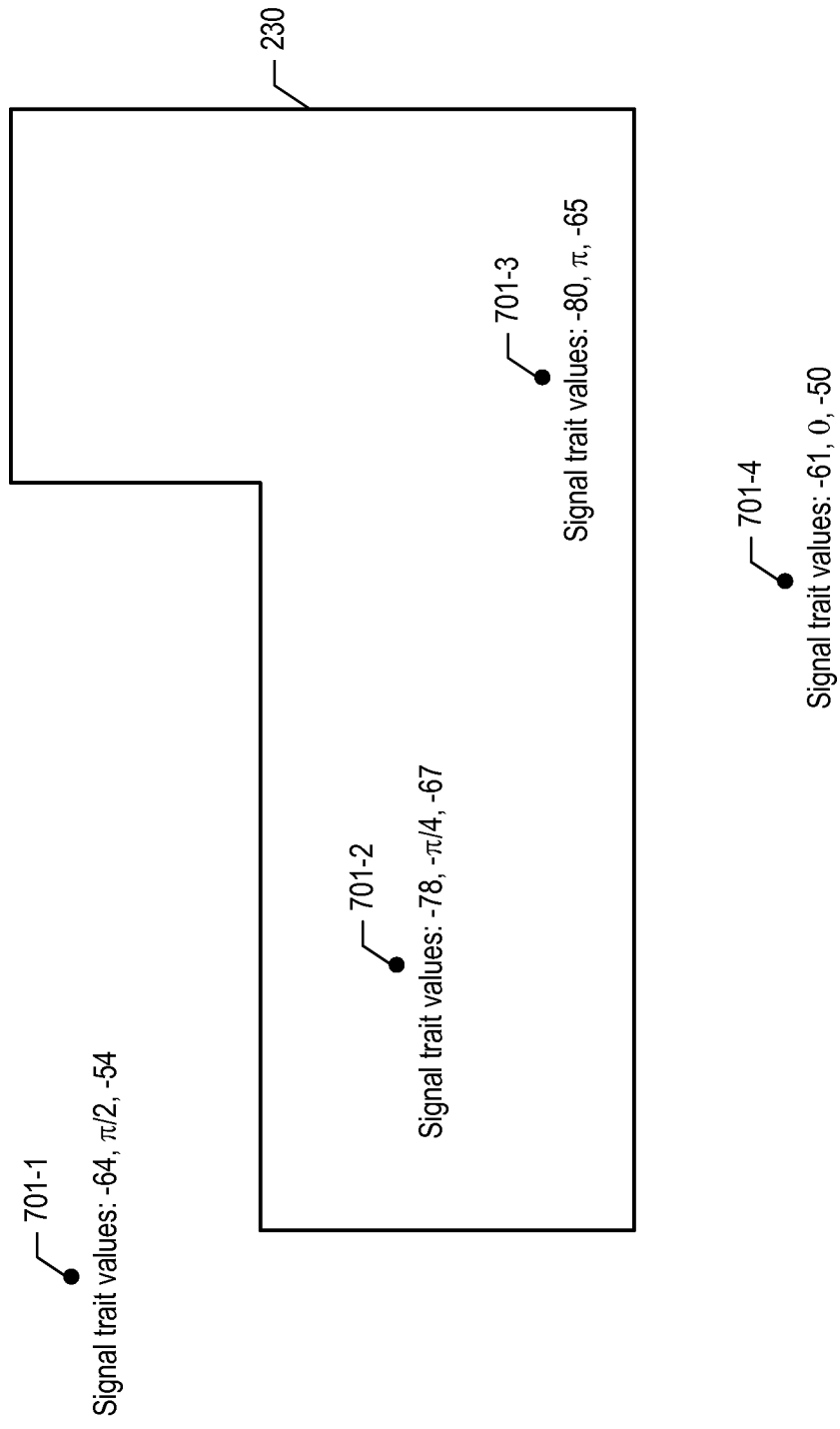
FIG. 7 depicts illustrative corrected measurements for a plurality of locations, in accordance with the illustrative embodiment of the present invention.

FIG. 7 depicts illustrative signal trait values for illustrative locations 701-1 through 701-4, in accordance with the illustrative embodiment of the present invention. As shown in FIG. 7, each location 701-i, where i is an integer between 1 and 4 inclusive, has three signal trait values; these signal trait values correspond to: the signal strength of a signal V at the location, the phase of signal V at the location, and the signal strength of a signal W at the location.

Figure 8:
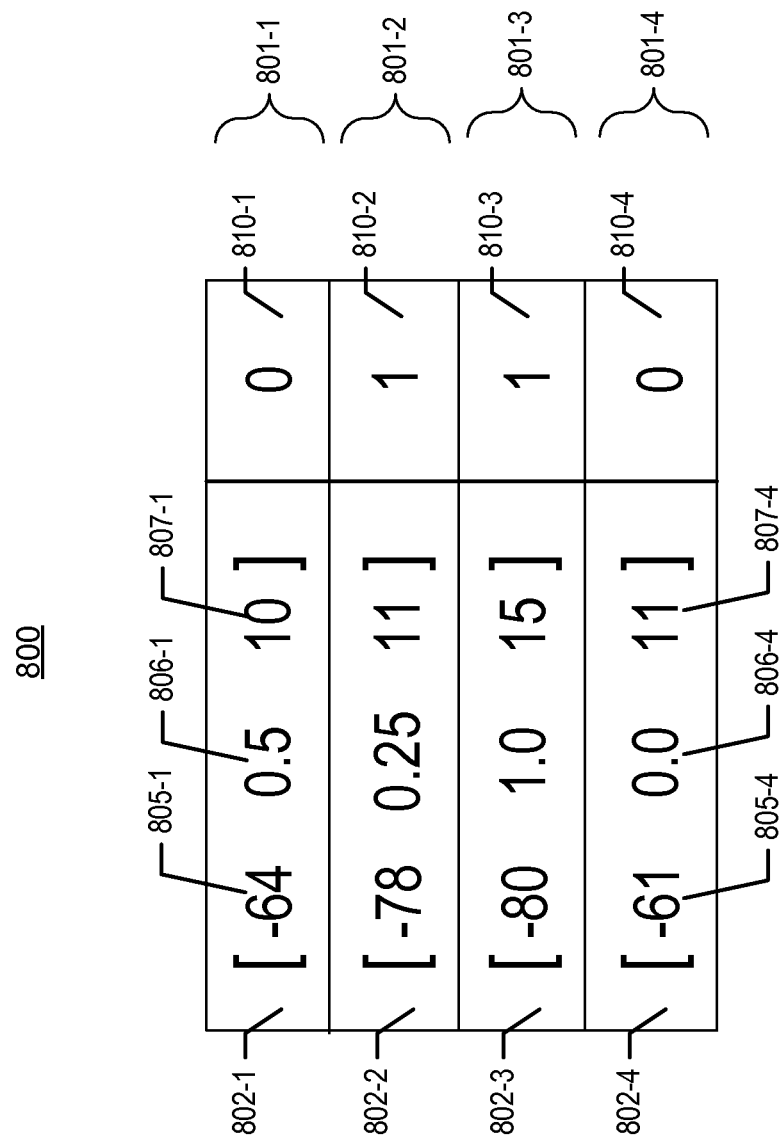
FIG. 8 depicts an illustrative training set derived from the corrected measurements of FIG. 7, in accordance with the illustrative embodiment of the present invention.

FIG. 8 depicts illustrative training set 800 derived from the signal trait values for locations 701-1 through 701-4, in accordance with the illustrative embodiment of the present invention. As shown in FIG. 8, training set 800 comprises four input/output mappings 801-1 through 801-4, each of which corresponds to locations 701-1 through 701-4, respectively.

Each mapping 801-i, where i is an integer between 1 and 4 inclusive, comprises input vector 802-i and Boolean output value 810-i. Furthermore, each input vector 802-i comprises three elements: 805-i, 806-i, and 807-i. Element 805-i corresponds to the signal strength of signal V at the corresponding location; element 806-i corresponds to the magnitude of the phase of first signal V at the corresponding location, normalized between 0 and 1 (i.e., 1 corresponds to π); and element 807-i corresponds to the difference in signal strength between signals W and V at the corresponding location. (As will be appreciated by those skilled in the art, the signal traits and input vector elements of FIGS. 7 and 8 are merely illustrative in nature, and are intended to serve as an example of the kinds of signal traits and inputs that might be employed.)

Boolean output value 810-i indicates whether the corresponding location is inside or outside of geographic zone 230, where 1 indicates inside and 0 indicates outside.

At subtask 504, location server 210 trains pattern classifier P with training set 800 in accordance with an appropriate learning algorithm, in well-known fashion. In accordance with the illustrative embodiment of the present invention, pattern classifier P is a type of pattern classifier known in the art as a support vector machine (SVM). As will be appreciated by those skilled in the art, a variety of other types of pattern classifiers might be used instead (e.g., a neural network, a decision tree, a genetic algorithm, etc.), and it is well-known in the art how to train such pattern classifiers.

After subtask 504 has been completed, execution proceeds to task 402 of FIG. 4.

Figure 9:
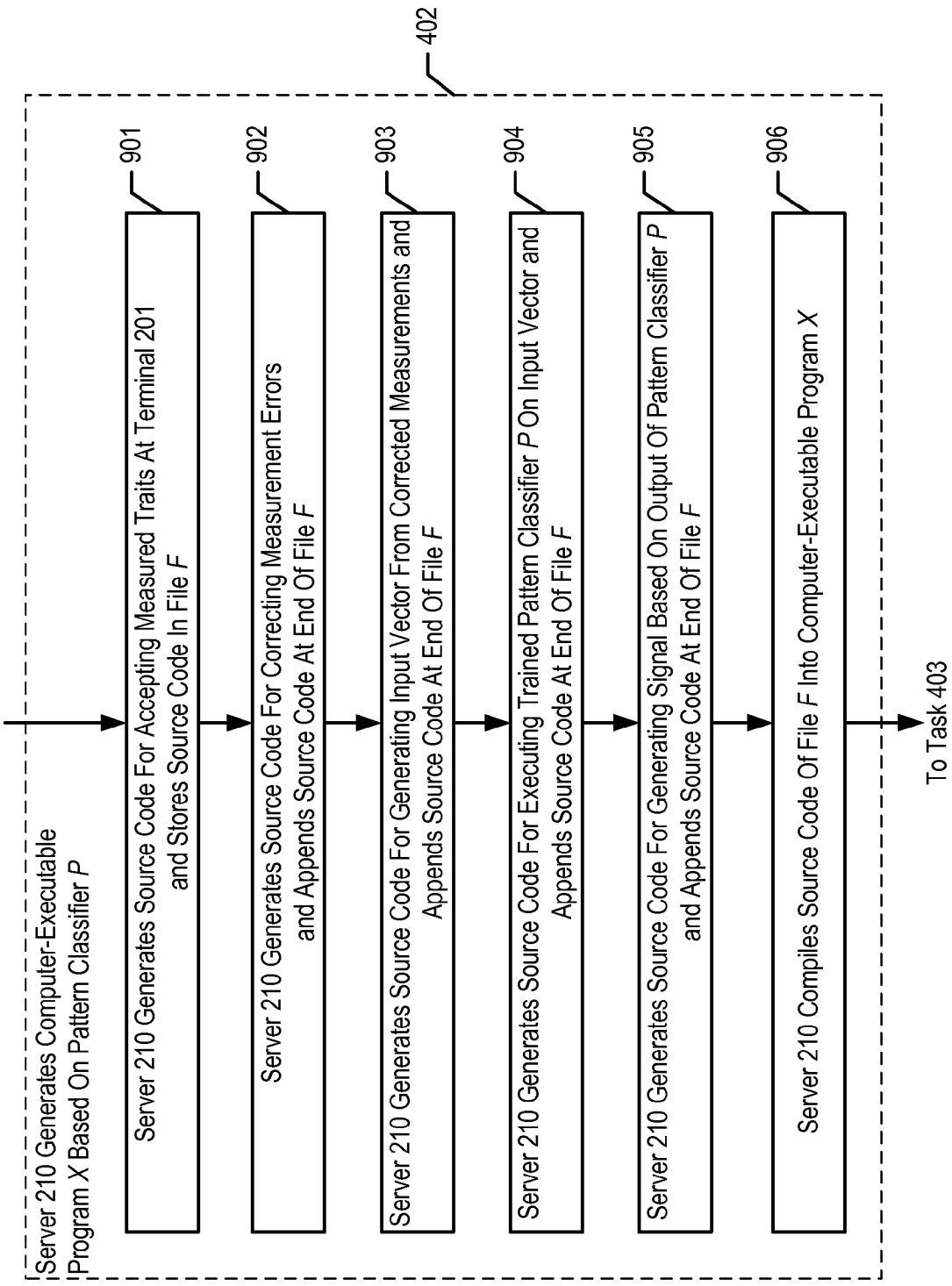
FIG. 9 depicts a detailed flowchart of the subtasks of task 402, as shown in FIG. 4, in accordance with the illustrative embodiment of the present invention.

FIG. 9 depicts a detailed flowchart of task 402 in accordance with the illustrative embodiment of the present invention. It will be clear to those skilled in the art, after reading this disclosure, which subtasks depicted in FIG. 9 can be performed simultaneously or in a different order than that depicted.

At subtask 901, location server 210 generates a first source code fragment for accepting measured traits at wireless terminal 201 and stores the fragment in a file F. In accordance with the illustrative embodiment, the source code fragment is generated by instantiating a pre-existing source code template so that it accepts the values of traits measured by the particular wireless terminal 201.

At subtask 902, a second source code fragment for correcting measurement errors at wireless terminal 201 is generated and appended at the end of file F. In accordance with the illustrative embodiment, the second source code fragment is generated by instantiating a pre-existing source code template with relevant entries from a calibration table, where the calibration table stores the values of a plurality of calibration functions C(R,K,Q) for various combinations of reported measurement R, characteristic K and trait Q. An illustrative calibration table is shown below in Table 1.

TABLE 1

| Illustrative Calibration Function Table | | | |
|---|---|---|---|
| R' = C(R, C, N) | | | |
| R | C = Motorola Model A008; Q = Signal Strength | ... | C = Samsung Model A800; Q = Signal Strength |
| −110 | −115 | ... | −107 |
| −109 | −114 | ... | −106 |
| ... | ... | ... | ... |
| −48 | −38 | ... | −50 |
| −47 | −37 | ... | −49 |

The purpose of the characteristic, K, is to identify which calibration function should be used in calibrating the reported measurements from wireless terminal 201, and, therefore, the characteristic, K, should be as indicative of the actual calibration function for wireless terminal 201 as is economically reasonable.

For example, the characteristic, K, can be, but is not limited to:
i. the unique identity of wireless terminal 201 (e.g., its electronic serial number ("ESN"), its international mobile station identifier ("IMSI"), its temporary international mobile station identifier ("TIMSI"), mobile station identification ("MSID"), its directory number ("DN"), etc.); or ii. the model of wireless terminal 201 (e.g., Timeport 26c, etc.); or iii. the make (i.e., manufacturer) of wireless terminal 201 (e.g., Motorola, Samsung, Nokia, etc.); or iv. the identity of the radio-frequency circuitry of wireless terminal 201 (e.g., Motorola RF circuit design 465LFRB, etc.); or v. the identity of one or more components of wireless terminal 201 (e.g., the part number of the antenna, the part number of the measuring component, etc.); or viii. any combination of i, ii, iii, iv, v, vi, and vii.

The most accurate characteristic is the unique identity of wireless terminal 201, because the calibration function generated for that very wireless terminal could then be used to correct the measurement errors at the terminal. It is unlikely, however, that this is economically feasible, because it would require that every wireless terminal be tested to determine its own unique distortion function.

On the other hand, using only the make of wireless terminal 201 as the characteristic, K, is economically reasonable, but it is unlikely that a single calibration function for all of a manufacturer's wireless terminals would provide very accurate calibrated signal-strength measurements.

As a compromise, the illustrative embodiment uses the combination of make and model of wireless terminal 201 as the characteristic, K, because it is believed that the amount of variation between wireless terminals of the same make and model will be small enough that a single calibration function for that model should provide acceptably accurate calibrated measurements for every wireless terminal of that make and model.

In accordance with the illustrative embodiment, the second source code template contains generic logic for correcting the trait measurements, and at subtask 902 the template is instantiated with the relevant portions of the table for wireless terminal 201.

As will be appreciated by those skilled in the art, some other embodiments of the present invention might employ characteristics K for calibration function C(R,K,Q) that differ from those of the illustrative embodiment, or might represent calibration function C(R,K,Q) in a manner other than tabular form, or might in fact do away with subtask 902 altogether (i.e., not even bother with correcting the measurements reported by wireless terminal 201), and it will be clear to those skilled in the art, after reading this disclosure, how to make and use such embodiments.

At subtask 903, a third source code fragment for generating an input vector from the corrected measurements is appended at the end of file F.

At subtask 904, a fourth source code fragment for simulating the execution of trained pattern classifier P on the input vector is generated and appended at the end of file F.

At subtask 905, a fifth source code fragment for generating an output signal based on the output of pattern classifier P is appended at the end of file F. The purpose of the output signal is to indicate to the user of wireless terminal 201 whether the terminal is inside or outside of geographic zone 230. As will be appreciated by those skilled in the art, the output signal might accomplish this in a variety of ways (e.g., setting the state of a light-emitting diode [LED] of wireless terminal 201, etc.). In accordance with the illustrative embodiment, a library of source code fragments is maintained for various makes and models of wireless terminals, and the appropriate source code fragment is selected for wireless terminal 201.

At subtask 906, the source code of file F is compiled into program X that can be executed by processor 341 of wireless terminal 201's subscriber identity module (SIM) 303. As will be appreciated by those skilled in the art, the program X executes locally at wireless terminal 201 (i.e., it runs completely on wireless terminal 201 without any communication with other data-processing systems or remote storage).

After subtask 906 has been completed, execution proceeds to task 403 of FIG. 4.

Figure 10:
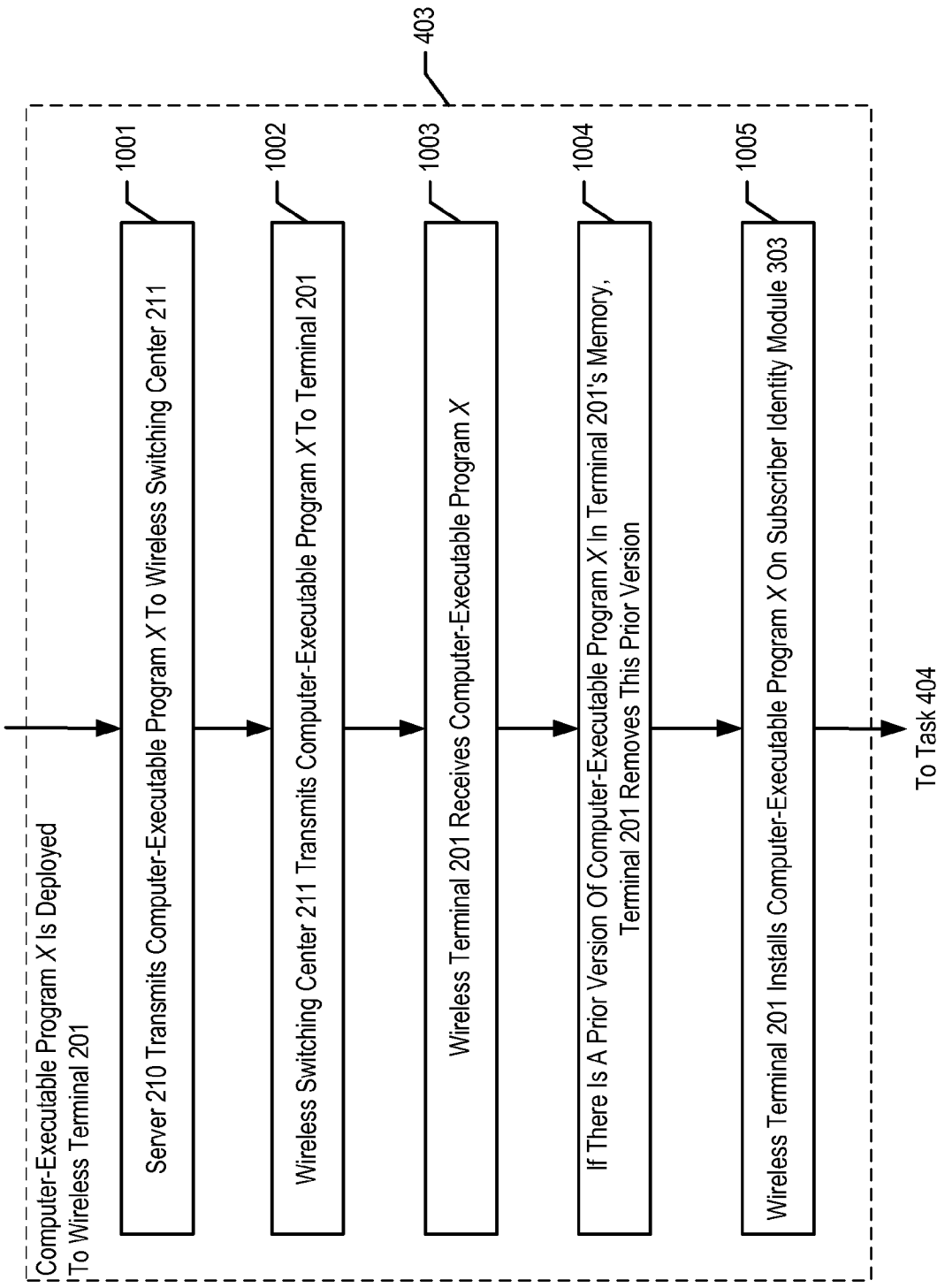
FIG. 10 depicts a detailed flowchart of the subtasks of task 403, as shown in FIG. 4, in accordance with the illustrative embodiment of the present invention.

FIG. 10 depicts a detailed flowchart of task 403 in accordance with the illustrative embodiment of the present invention. It will be clear to those skilled in the art, after reading this disclosure, which subtasks depicted in FIG. 10 can be performed simultaneously or in a different order than that depicted.

At subtask 1001, location server 210 transmits computer-executable program X to wireless switching center 211.

At subtask 1002, wireless switching center 211 transmits computer-executable program X to wireless terminal 201 via the appropriate base station 102, in well-known fashion.

At subtask 1003, wireless terminal 201 receives computer-executable program X.

At subtask 1004, wireless terminal 201 checks if there is a prior version of computer-executable program X stored in memory 342 of subscriber identity module 303. If so, wireless terminal 201 removes the prior version from memory 342.

At subtask 1005, wireless terminal 201 installs computer-executable program X on subscriber identity module 303.

After subtask 1005 has been completed, execution proceeds to task 404 of FIG. 4.

Figure 11:
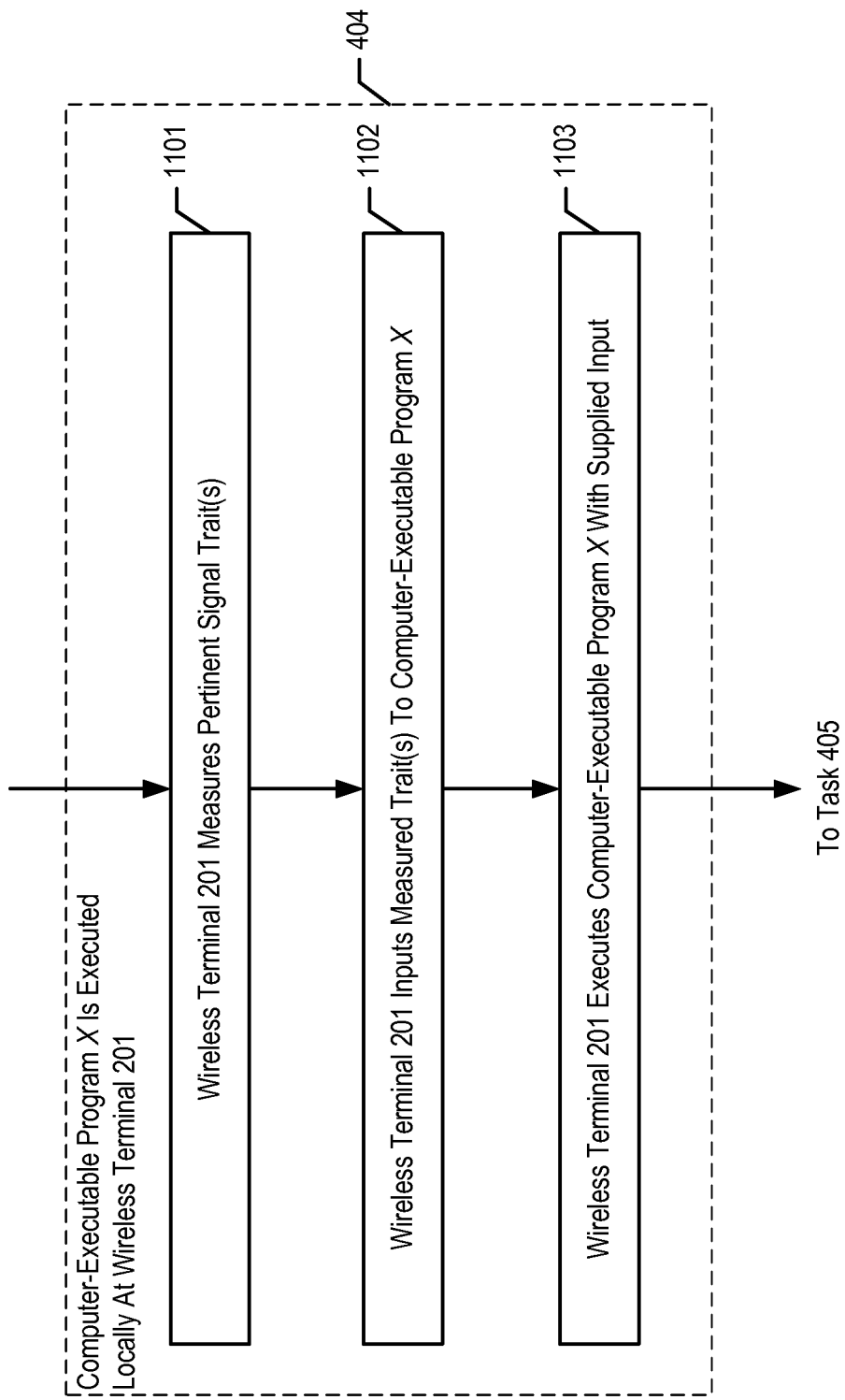
FIG. 11 depicts a detailed flowchart of the subtasks of task 404, as shown in FIG. 4, in accordance with the illustrative embodiment of the present invention.

FIG. 11 depicts a detailed flowchart of task 404 in accordance with the illustrative embodiment of the present invention. It will be clear to those skilled in the art, after reading this disclosure, which subtasks depicted in FIG. 11 can be performed simultaneously or in a different order than that depicted.

At subtask 1101, wireless terminal 201 measures the pertinent trait(s) of the pertinent electromagnetic signal(s) received at the terminal.

At subtask 1102, wireless terminal 201 inputs the measured trait(s) to computer-executable program X.

At subtask 1103, wireless terminal 201 executes computer-executable program X with the input supplied at subtask 1102. As described above, computer-executable program X processes the input and generates an output signal that indicates to the user of wireless terminal 201 whether or not the terminal is inside or outside of geographic zone 230.

After subtask 1103 has been completed, execution proceeds to task 405 of FIG. 4.

As will be appreciated by those skilled in the art, there are a variety of ways in which some embodiments of the present invention might differ from the illustrated embodiment. A number of such variations is described in the following paragraphs, and it will be clear to those skilled in the art, after reading this disclosure, how to make and use such embodiments:

In some embodiments of the present invention the input vectors of a training set might comprise day/time information, thereby enabling the pattern classifier to learn the temporal behavior of terminal 201's user (e.g., the fact that the user is typically in his or her home zone between 9 pm and 7 am on weeknights, etc.). Moreover, some embodiments might explicitly encode temporal behavior in the computer-executable program generated at task 402—for example via rules or some other form of knowledge representation—either in combination with, or instead of, the learning-based approach.

In some embodiments of the present invention, a version of computer-executable program X that executes a "generic" version of a pattern classifier and accepts appropriate parameters for the pattern classifier (e.g., the weights of a support vector machine or neural network, etc.) might be pre-installed on wireless terminal 201. In such embodiments, location server 210 need only transmit the parameter values of trained pattern classifier P to wireless terminal 201 at task 403, rather than an entire computer-executable program. Subsequently at task 404, wireless terminal 201 executes the pre-installed program at task 404 with the parameter values received at task 403. (If necessary, wireless terminal 201 might first substitute the parameter values received at task 403 for previous values stored at the terminal, prior to performing task 404.) It will be clear to those skilled in the art, after reading this disclosure, how to make and use such embodiments of the present invention.

In some embodiments of the present invention, at least a portion of the computer-executable program might be deployed within the network infrastructure (e.g., at location server 210, etc.) instead of at wireless terminal 201, thereby potentially reducing the burden to terminal 201's processor, battery, and memory, as well as improving security and enabling fraud prevention and detection. Moreover, in such embodiments the signaling message traffic from wireless terminal 201 to location server 210 can be advantageously reduced by transmitting measurements only when wireless terminal 201 is in general proximity to a zone.

Some embodiments of the present invention might employ a "crude" zone or location estimation technique (e.g., based on Cell Identifier [Cell-ID], etc.) in combination with the pattern classifier of the illustrative embodiment. For example, a crude estimation technique might be employed to first determine when wireless terminal 201 is close to the zone of interest, with the pattern classifier invoked subsequently to estimate the terminal's in/out zone status. Similarly, the temporal behavior techniques disclosed in the present application might be employed in combination with the crude and pattern classifier estimation techniques. For example, if a wireless terminal is typically in the home zone Cell-ID, then it might be inferred that the user is "home" and the pattern classifier could be trained or re-trained for fine zone estimation accordingly. The crude estimation technique might also be called upon to provide assistance when the pattern classifier's quality/confidence metric is below a particularly threshold, or might be relied upon exclusively while the pattern classifier is being trained or re-trained.

Some embodiments of the present invention might employ multiple pattern classifiers based on different network identifiers, cell-IDs or other crude location estimates, time of day, day of week, emergencies (e.g. chemical spill, terrorist attack, etc.), sporting events, etc., and dynamically download the corresponding computer-executable programs to wireless terminal 201 accordingly. Moreover, some embodiments might store a plurality of computer-executable programs on wireless terminal 201 simultaneously, if memory permits, (e.g., computer-executable programs for each of a plurality of zones, etc.) rather than a single program, as in the illustrative embodiment.

In some embodiments of the present invention, training data or pattern classifiers might be extended from one terminal or user to other terminals or users. For example, members of a family or office workers in the same office may share the same or similar zones, in which case the training data or pattern classifier for one member of the group might be applied—wholly or in part—to other members of the group. Alternatively, the pattern classifier for one user might be a "starting point" for further training or modification for other users.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
    training a pattern classifier on a plurality of input-output mappings, resulting in a trained pattern classifier, wherein each of said input-output mappings comprises
        (i) an input that is based on one or more traits of one or more electromagnetic signals at a respective geo-location, and
        (ii) a Boolean output that indicates whether the respective geo-location is inside a geographic zone Z; and
    generating a computer-executable program based on the trained pattern classifier, wherein said computer-executable program is executable on a wireless terminal to correct measurements made by the wireless terminal and to estimate whether said wireless terminal is inside said geographic zone Z, and
    transmitting said computer-executable program to said wireless terminal via a wireless switching center.

2. The method of claim 1 wherein said computer-executable program is for local execution at a wireless terminal.

3. The method of claim 2 wherein said computer-executable program is based on a characteristic of said wireless terminal.

4. The method of claim 1 further comprising:
    re-training said pattern classifier on a new plurality of input-output mappings in response to a change in said geographic zone Z; and
    generating a new computer-executable program based on the re-trained pattern classifier.

5. The method of claim 1 further comprising:
    re-training said pattern classifier on a new plurality of input-output mappings in response to a change in a network comprising one or more electromagnetic signal transmitters; and
    generating a new computer-executable program based on the re-trained pattern classifier.

6. A method comprising:
    training a pattern classifier on a plurality of input-output mappings, resulting in a trained pattern classifier, wherein each of said input-output mappings comprises
        (i) an input that is based on one or more traits of one or more electromagnetic signals at a respective geo-location, and
        (ii) a Boolean output that indicates whether the respective geo-location is inside a geographic zone Z; and
    transmitting one or more parameter values of the trained pattern classifier to a wireless terminal, wherein said one or more parameter values are used by the wireless terminal to correct measurements made by the wireless terminal and to determine whether said wireless terminal is inside said geographic zone Z.

7. The method of claim 6 wherein said parameter values are for instantiating a computer-executable program that executes locally at said wireless terminal and that estimates whether said wireless terminal is inside said geographic zone Z.

8. The method of claim 6 further comprising:
re-training said pattern classifier on a new plurality of input-output mappings in response to a change in said geographic zone Z; and
transmitting one or more parameter values of the re-trained pattern classifier to said wireless terminal.

9. The method of claim 6 further comprising:
re-training said pattern classifier on a new plurality of input-output mappings in response to a change in a network comprising one or more electromagnetic signal transmitters; and
transmitting one or more parameter values of the re-trained pattern classifier to said wireless terminal.

10. A location server comprising:
a data-processing system for:
training a pattern classifier on a plurality of input-output mappings, resulting in a trained pattern classifier, wherein each of said input-output mappings comprises:
(i) an input that is based on one or more traits of one or more electromagnetic signals at a respective geo-location, and
(ii) a Boolean output that indicates whether the respective geo-location is inside a geographic zone Z;
generating a computer-executable program based on the trained pattern classifier, wherein said computer-executable program is executable on a wireless terminal to correct measurements made by the wireless terminal and to estimate whether said wireless terminal is inside said geographic zone Z; and
communicating with a wireless switching center to transmit said computer-executable program to said wireless terminal.

11. The location server of claim 10 wherein said computer-executable program is for local execution at a wireless terminal.

12. The location server of claim 11 wherein said computer-executable program is based on a characteristic of said wireless terminal.

13. The location server of claim 10 wherein said data-processing system is also for:
re-training said pattern classifier on a new plurality of input-output mappings in response to a change in said geographic zone Z, and
generating a new computer-executable program based on the re-trained pattern classifier.

14. The location server of claim 10 wherein said data-processing system is also for:
re-training said pattern classifier on a new plurality of input-output mappings in response to a change in a network comprising one or more electromagnetic signal transmitters, and
generating a new computer-executable program based on the re-trained pattern classifier.

15. The location server of claim 10 wherein said communicating by said data-processing system comprises transmitting said computer-executable program to said wireless switching center.

16. The location server of claim 10 wherein said communicating by said data-processing system comprises transmitting said computer-executable program to said wireless switching center for transmission thereby to a wireless terminal, and wherein said computer-executable program is for local execution at said wireless terminal.

17. A location server comprising:
a data-processing system for:
training a pattern classifier on a plurality of input-output mappings, resulting in a trained pattern classifier, wherein each of said input-output mappings comprises:
(i) an input that is based on one or more traits of one or more electromagnetic signals at a respective geo-location, and
(ii) a Boolean output that indicates whether the respective geo-location is inside a geographic zone Z; and
transmitting one or more parameter values of the trained pattern classifier to a wireless terminal, wherein said one or more parameter values are used by the wireless terminal to correct measurements made by the wireless terminal and to determine whether said wireless terminal is inside said geographic zone Z.

18. The location server of claim 17 wherein said parameter values are for instantiating a computer-executable program that executes locally at said wireless terminal and that estimates whether said wireless terminal is inside said geographic zone Z.

19. The location server of claim 17 wherein said data-processing system is also for:
re-training said pattern classifier on a new plurality of input-output mappings in response to a change in said geographic zone Z, and
transmitting one or more parameter values of the re-trained pattern classifier to said wireless terminal.

20. The location server of claim 17 wherein said data-processing system is also for:
re-training said pattern classifier on a new plurality of input-output mappings in response to a change in a network comprising one or more electromagnetic signal transmitters, and
transmitting one or more parameter values of the re-trained pattern classifier to said wireless terminal.

21. A location server comprising:
a data-processing system for:
training a pattern classifier on a plurality of input-output mappings, resulting in a trained pattern classifier, wherein each of said input-output mappings comprises:
(i) an input that is based on one or more traits of one or more electromagnetic signals at a respective geo-location, and
(ii) a Boolean output that indicates whether the respective geo-location is inside a geographic zone Z;
generating a computer-executable program based on the trained pattern classifier, wherein said computer-executable program is executable on a wireless terminal to correct measurements made by the wireless terminal and to estimate whether said wireless terminal is inside said geographic zone Z; and
transmitting said computer-executable program to said wireless terminal via a wireless switching center.

22. The location server of claim 21 wherein said data-processing system is also for:
re-training said pattern classifier on a new plurality of input-output mappings in response to a change in said geographic zone Z, and
transmitting one or more parameter values of the re-trained pattern classifier to said wireless terminal.

23. The location server of claim 21 wherein said data-processing system is also for:
- re-training said pattern classifier on a new plurality of input-output mappings in response to a change in a network comprising one or more electromagnetic signal transmitters, and
- transmitting one or more parameter values of the re-trained pattern classifier to said wireless terminal.

* * * * *